United States Patent [19]
Tanaka et al.

[11] Patent Number: 6,003,053
[45] Date of Patent: Dec. 14, 1999

[54] PULSE SIGNAL GENERATION CIRCUIT AND PULSE SIGNAL GENERATION METHOD

[75] Inventors: Youichi Tanaka, Neyagawa; Kazuhiro Mishina, Moriyama, both of Japan

[73] Assignee: Matsushita Electric Works, Ltd., Osaka, Japan

[21] Appl. No.: 08/971,846

[22] Filed: Nov. 18, 1997

[30] Foreign Application Priority Data

Nov. 29, 1996 [JP] Japan ............................ 8-319406

[51] Int. Cl.⁶ .................................................. H03K 23/48
[52] U.S. Cl. ........................................... 708/103; 377/48
[58] Field of Search ............................ 364/703; 377/48, 377/49; 708/103

[56] References Cited

U.S. PATENT DOCUMENTS 4,559,613  12/1985  Murphy et al. ...................... 364/703
4,991,188   2/1991  Perkins ................................. 377/49
5,473,553  12/1995  Thierry ................................ 364/703

FOREIGN PATENT DOCUMENTS 6412617  1/1989  Japan .
1135225  5/1989  Japan .

*Primary Examiner*—David H. Malzahn
*Attorney, Agent, or Firm*—Greenblum & Bernstein, P.L.C.

[57] ABSTRACT

A pulse signal generation circuit comprises a frequency setting register which is at least (n+1) bits long for setting a value of $2^n$ or smaller as a frequency value of a pulse signal to be generated, and a cumulative addition circuit having an adder and a flip-flop which is at least (n+1) bits long. The cumulative addition circuit repeats at a rate of $2^{n+1}$ times per second, operations of making the adder add a value set in the frequency setting register to a value held in the flip-flop and then making the flip-flop hold the addition result, and outputs a signal having a value of (n+1)th bit in the flip-flop as the pulse signal.

33 Claims, 15 Drawing Sheets

PULSE SIGNAL GENERATION CIRCUIT AND PULSE SIGNAL GENERATION METHOD

BACKGROUND OF THE INVENTION

1. Field of the Invention

The present invention relates to a pulse signal generation circuit which outputs a pulse signal generated by dividing a clock pulse signal and to a pulse signal generation method of outputting such a pulse signal.

2. Description of the Prior Art

Such a type of conventional pulse signal generation circuit has been disclosed in Japanese Laid-open Patent Application No. 64-12617, which is incorporated herein by reference.

The above pulse generation circuit is, as shown in FIG. 16, comprises a counter C for setting a frequency value, a memory M for storing data among which the data corresponding to the frequency value is read by using the frequency value as address signals, a first flip-flop $F_1$ for latching and outputting data read from the memory, a full adder A for inputting the output of the first flip-flop $F_1$, and a second flip-flop $F_2$ for latching an added value of the full adder A by a predetermined clock signal.

The above pulse generation circuit adds the output of the first flip-flop $F_1$ and the output of the second flip-flop $F_2$, enters to the counter C a carry signal which is generated by the second flip-flop $F_2$ when the added value latched by the second flip-flop $F_2$ exceeds a predetermined value, and outputs the carry signal as a pulse signal of a frequency whose value is set in the counter C until the counter C prohibits the passing of the carry signal.

In the above-mentioned conventional pulse signal generation circuit, it is possible to output a pulse signal of the frequency whose value is set in the counter C and can be other than a power of 2.

However, this circuit has problems that it is necessary to read data corresponding to the frequency value from the memory M by using the frequency values as address signals so that the first flip-flop $F_1$ may latch the data. Consequently, the number of processes is increased and the internal structure is complicated, which makes the production of the circuit time-consuming and also brings a disadvantage in terms of operational speed.

SUMMARY OF THE INVENTION

Accordingly, the object of the present invention is to provide a pulse signal generation circuit which can output a pulse signal of a frequency which is other than a power of 2, preventing the internal structure from being complicated and avoiding a decrease in the operational speed.

According to a first aspect of the invention we provide a pulse signal generation circuit comprising: a frequency setting register which is at least (n+1) bits long for setting a value of $2^n$ or smaller as a frequency value of a pulse signal to be generated; and cumulative addition means having an adder and a flip-flop which is at least (n+1) bits long. The cumulative addition means repeats at a rate of $2^{n+1}$ times per second, operations of making the adder add a value set in the frequency setting register to a value held in the flip-flop and then making the flip-flop hold the addition result, and outputs a signal having a value of (n+1)th bit in the flip-flop as the pulse signal.

With the above pulse signal generation circuit according to the first aspect of the invention, every time a clock pulse of $2^{n+1}$ Hz is inputted, the cumulative addition means makes the adder sequentially accumulates the binary-coded frequency value and holds the accumulated value. Then, while the $2^{n+1}$ clock pulses are inputted, the same number of carries (changes from "0" to "1") as the frequency value occur on the (n+1)th bit. Therefore, the carry signal for the carry, that is, the (n+1)th bit signal becomes a pulse signal of the frequency whose value is set in the frequency setting register. Thus, a pulse signal of a frequency whose value is other than a power of 2 can be outputted. In addition, what is added by the adder 2 is not a data read from a memory by using a frequency value as address signals like a prior art, but the frequency value itself. Consequently, it becomes unnecessary to read a data from a memory, decreasing the number of processes and simplifying the internal structure, which leads to a less troublesome production of the pulse generation circuit. In addition, a decrease in the operational speed can be avoided.

According to a second aspect of the invention, based on the first aspect of the present invention, we provide a pulse signal generation circuit comprising: a frequency variation register for setting a frequency variation value; an adder-subtracter; addition-subtraction control means for controlling the frequency variation register and the adder-subtracter so as to repeat, at a predetermined calculation interval, operations of adding or subtracting a value set in the frequency setting register and a value set in the frequency variation register with the adder-subtracter and then re-setting a result of the addition or subtraction in the frequency setting register as the frequency value.

With the above pulse signal generation circuit according to the second aspect of the invention, when a frequency value become an accumulated value of sequentially accumulated frequency variation values by the addition-subtraction means, it changes by a frequency variation value at every calculation interval under the control of the addition-subtraction control means. Consequently, it becomes possible to change the frequency value of a pulse signal outputted with a pulse width of the calculation interval. Thus, when this pulse signal is inputted into a stepping motor, the rotation speed of the stepping motor can be changed.

According to a third aspect of the invention, we provide a pulse signal generation method comprising the steps of: setting a value of $2^n$ or smaller as a frequency value of a pulse signal to be generated in a frequency setting register; cumulatively adding a value set in the frequency setting register at a rate of $2^{n+1}$ times per second; and outputting, as the pulse signal, a signal having a value of (n+1)th bit in the cumulative addition value obtained by the cumulative addition.

According to a fourth aspect of the invention, based on the third aspect of the present invention, we provide a pulse signal generation method comprising the steps of: setting a frequency variation value in the frequency variation register; cumulatively adding or subtracting a value set in the frequency variation register at a predetermined calculation interval; and re-setting at the calculation interval, a cumulative value of the addition or subtraction obtained by the addition or subtraction at the calculation interval in the frequency setting register as the frequency value.

DETAILED DESCRIPTION OF THE PREFERRED EMBODIMENTS

Figure 1:
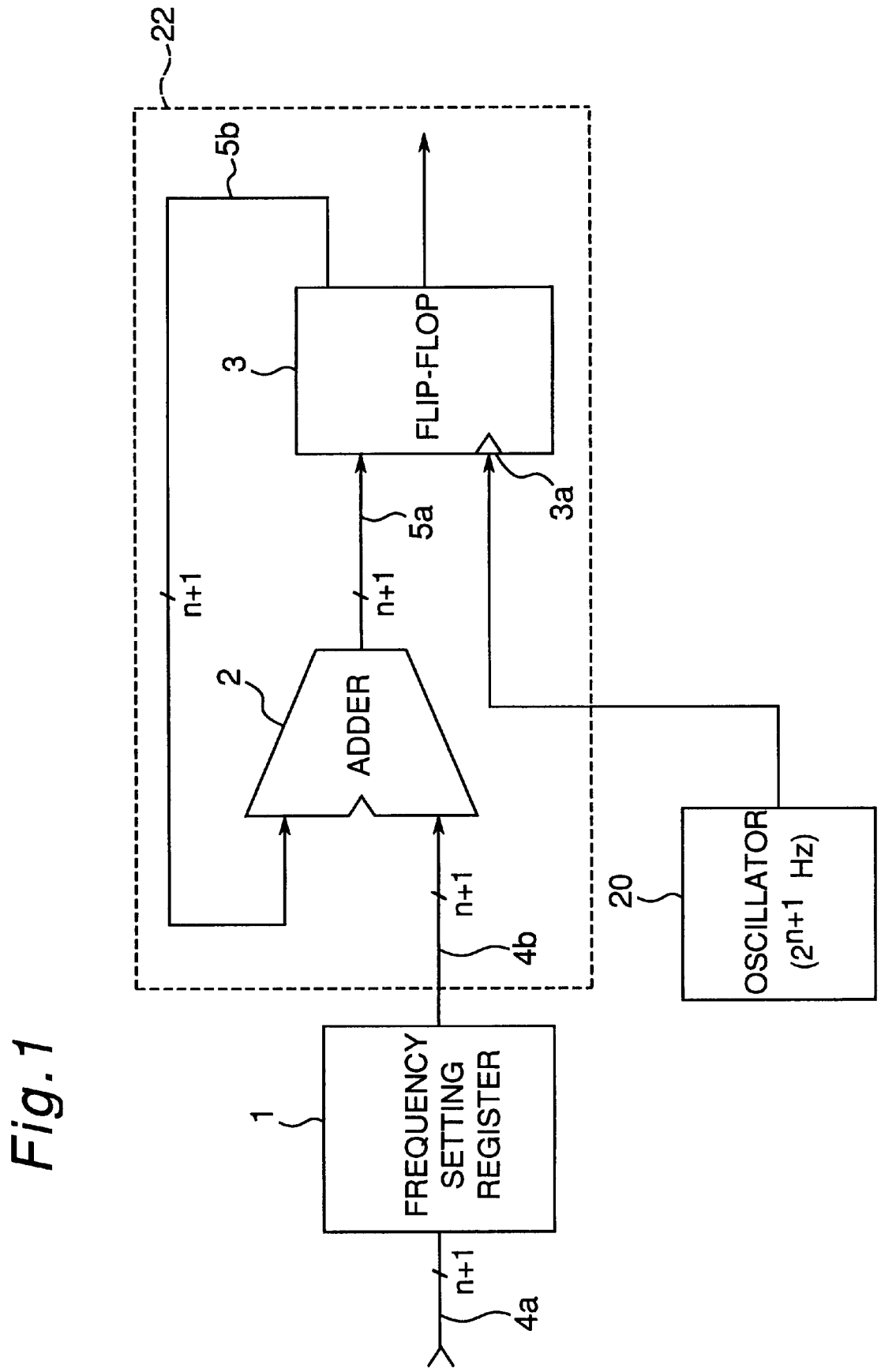
FIG. 1 is a block diagram showing the constitution of a pulse generation circuit according to a first embodiment of the present invention.

The first embodiment of the present invention will be described as follows, based on FIG. 1 through FIG. 3. This pulse signal generation circuit comprises a frequency setting register 1, an oscillator 20, and a cumulative addition circuit 22 having an adder 2 and a flip-flop 3.

Figure 2:
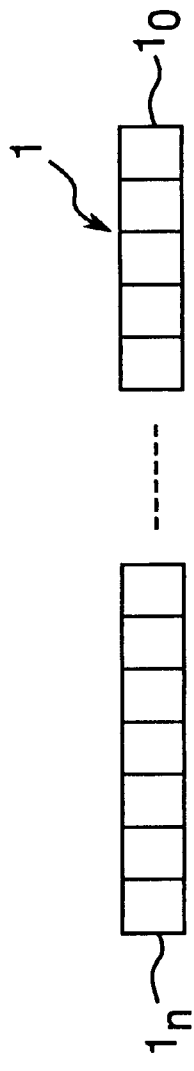
FIG. 2 is a diagram for illustrating a frequency setting register of the first embodiment.
Figure 3:
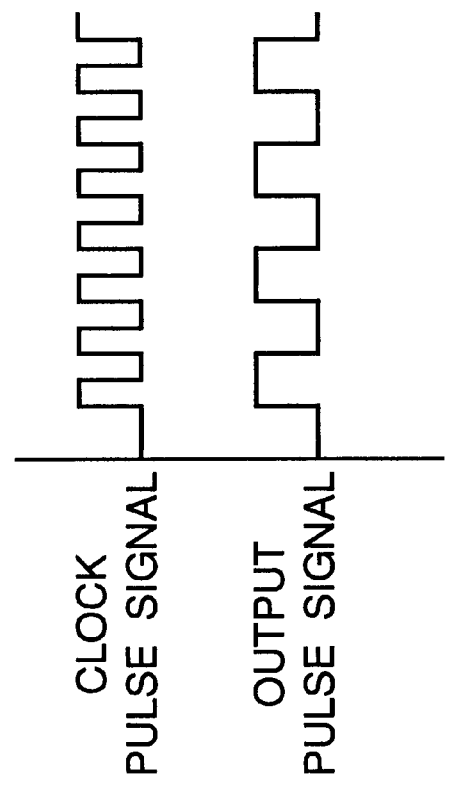
FIG. 3 shows signal waveforms of a clock pulse signal and an output pulse signal generated in the first embodiment.

The frequency setting register 1 is used for setting a frequency value of $2^n$ or smaller, and has (n+1) bits consisting of the 0-th bit $1_0$ of the first bit through the n-th bit $1_n$ of the (n+1)th bit as shown in FIG. 2. To be more specific, via a (n+1) bit bus 4a the frequency value is set into the frequency setting register 1.

The adder 2 is connected to the frequency setting register 1 by a (n+1) bit bus 4b so as to make it possible to add the frequency value set in the frequency setting register 1.

The oscillator 20 generates a clock pulse signal of $2^{n+1}$ Hz and supplies it to the signal input terminal 3a of the flip-flop 3.

The flip-flop 3 is (n+1) bits long. Every time a clock pulse is inputted from the clock pulse signal input terminal 3a, the flip-flop 3 makes the adder 2 connected via a (n+1) bit bus 5a add the frequency value and holds the added value until the next clock pulse is inputted. The flip-flop 3 further feedbacks the added value to the adder 2 via a (n+1) bit bus 5b and makes the adder 2 sequentially accumulate (cumulative addition) the frequency value. Through these processes, in the accumulated value held in the flip-flop 3, the same number of carries (changes from "0" to "1") as the frequency value occur on the (n+1)th bit while $2^{n+1}$ clock pulses are being inputted.

For example, in a case where a target frequency value is 2 Hz, when n=1 is chosen to satisfy $2 \leq 2^n$, then n+1=2 is obtained, so that the frequency setting register 1 must have 2 bits. Every time a clock pulse of $2^{n+1}=2^2$, or 4 Hz is inputted into the flip-flop 3, the binary-coded number of the decimal number "2", namely "10" is sequentially added starting at the initial value "00" by the adder 2, and the accumulated value is held in the frequency setting register 1. As a result, when the first and third clock pulse are inputted, "1" is carried to the second bit. In other words, while four clock pulses are inputted, a change from "0" to "1", namely, a carry occurs twice on the second bit, and when the carry signal for the carry is outputted, a pulse signal whose frequency is 2 Hz is outputted. This pulse signal is shown in FIG. 3.

In a case where a target frequency value is 3 Hz, when n=2 is chosen to satisfy $3 \leq 2^n$, then n+1=3 is obtained, so that the frequency setting register 1 must have 3 bits. Every time a clock pulse of $2^{n+1}=2^3$, or 8 Hz is inputted into the flip-flop 3, the binary-coded number of the decimal number "3", namely, "11" is sequentially added starting at the initial value "00" by the adder 2, and the accumulated value is held in the frequency setting register 1. As a result, when the second, fourth and seventh clock pulses are inputted, "1" is carried to the third bit. In other words, while eight clock pulses are inputted, a change from "0" to "1" (a carry) occurs three times on the third bit, and when the carry signal for the carry is outputted, a pulse signal whose frequency is 3 Hz is outputted.

In this pulse signal generation circuit, as described above, every time a clock pulse of $2^{n+1}$ Hz is inputted, the flip-flop 3 makes the adder 2 sequentially accumulate the frequency value converted to binary numbers and holds the accumulated value. Then, while the $2^{n+1}$ clock pulses are inputted, the same number of carries (changes from "0" to "1") as the frequency value occur on the (n+1)th bit. Therefore, the carry signal for the carry, that is, the (n+1)th bit signal becomes a pulse signal of the frequency whose value is set in the frequency setting register 1. Thus, a pulse signal of a frequency whose value is other than a power of 2 can be outputted. In addition, what is added by the adder 2 is not a data read from a memory by using a frequency value as address signals like a prior art, but the frequency value itself. Consequently, it becomes unnecessary to read a data from a memory, decreasing the number of processes and simplifying the internal structure, which leads to a less troublesome production of the pulse generation circuit. In addition, a decrease in the operational speed can be avoided.

The second embodiment of the present invention will be described as follows, based on FIGS. 4 and 5. The elements substantially having the same functions as those of the first embodiment are referred to with the same reference numbers, and the following description will be focused on the features different from the first embodiment. Although a frequency value to be set in the frequency setting register is fixed in the first embodiment, it is variable in the present embodiment.

To be more specific, this pulse signal generation circuit comprises a frequency variation register 6, an addition-subtraction circuit 7, and an addition-subtraction controller 8, in addition to the elements of the first embodiment.

The frequency variation register 6 is used for setting a frequency variation value and is n bits long.

The addition-subtraction circuit 7 is connected to the frequency variation register 6 via a (n+1) bit bus 4c so as to add or subtract the frequency variation value set in the frequency variation register 6. This addition-subtraction circuit 7 is connected to the frequency setting register 1 via the (n+1) bit bus 4a so as to make the frequency setting register 1 input the added or subtracted value. The addition-subtraction circuit 7 is also connected to the frequency setting register 1 via a (n+1) bit feedback bus 4d which feedbacks the added or subtracted value from the frequency setting register 1, so that the frequency variation value is sequentially accumulated (accumulatively added or subtracted).

The addition-subtraction controller 8 consists of a CPU and implements an addition-subtraction control means 9. This addition-subtraction controller 8 inputs an addition-subtraction indicative signal for designating the calculation interval $T_1$ of addition and subtraction performed by the addition-subtraction circuit 7, into the frequency setting register 1, and also inputs a mode control signal for controlling the operation in the addition-subtraction circuit 7 (whether to perform addition, or subtraction, or to stop calculation operation), into the addition-subtraction circuit 7. In short, the addition-subtraction control means 9 implemented by the addition-subtraction controller 8 so controls that the frequency variation value is sequentially accumulated at the calculation interval $T_1$ by the addition-subtraction circuit 7, and the accumulated value is inputted as a frequency value to the frequency setting register 1. The calculation interval $T_1$ corresponds to a pulse width or a pulse interval.

To be more specific, the addition-subtraction controller 8 can input the above-mentioned addition-subtraction indicative signal into the frequency setting register 1 and also can suspend the inputting. In short, the addition-subtraction controller 8 can either supply the signal or suspend the supplying. Consequently, the accumulation as a result of addition and subtraction in the addition-subtraction circuit 7 becomes possible only when the addition-subtraction controller 8 inputs the addition-subtraction indicative signal into the frequency setting register 1, and the interval of the addition-subtraction indicative signal from the addition-subtraction controller 8 becomes the calculation interval $T_1$ of the addition and subtraction in the addition-subtraction circuit 7. The calculation interval $T_1$ has a fixed interval because the addition-subtraction indicative signal is inputted into the frequency setting register 1 at a fixed interval.

The operations of the pulse generation circuit will be described. When a mode control signal from the addition-subtraction controller 8 is inputted into the addition-subtraction circuit 7 and the addition-subtraction indicative signal from the addition-subtraction controller 8 is inputted into the frequency setting register 1, the addition-subtraction circuit 7 adds or subtracts a frequency variation value so as to make the accumulated value that is frequency value. As a result, the frequency value changes by the frequency variation value. In short, the frequency variation value corresponds to a change Δf of the frequency value and the frequency of a pulse signal to be outputted changes as shown in FIG. 5. Consequently, when the pulse signal outputted from the pulse signal generation circuit is inputted into a stepping motor (not shown), the rotation speed of the stepping motor changes along the slanting straight line shown in FIG. 5. When the addition-subtraction indicative signal from the addition-subtraction controller 8 is no longer inputted into the frequency setting register 1, the frequency value is fixed.

According to the pulse signal generation circuit, in addition to the effects of the first embodiment, when a frequency value become an accumulated value obtained by the sequential accumulation of frequency variation values with the addition-subtraction circuit 7, it changes by a frequency variation value at every calculation interval $T_1$ under the control of the addition-subtraction control means 9. Consequently, it becomes possible to change the frequency of a pulse signal outputted with a pulse width of the calculation interval $T_1$. Thus, when this pulse signal is inputted into a stepping motor, the rotation speed of the stepping motor can be changed.

When the supply of the addition-subtraction indicative signal from the addition-subtraction control means is suspended, the addition-subtraction circuit 7 does not add or subtract the frequency variation value and the accumulated value does not change. As a result, the frequency value in the frequency setting register 1 becomes unchanged, and the frequency of the pulse signal to be outputted is fixed, so that the frequency value which is changed so far can be fixed halfway. Consequently, when this pulse signal is inputted into a stepping motor, the rotation speed of the stepping motor can be changed or maintained.

The third embodiment of the present invention will be described as follows, based on FIG. 6. The elements substantially having the same functions as those of the second embodiment are referred to with the same reference numbers, and the following description will be focused on the features different from the second embodiment. Although the addition-subtraction controller 8 consists of a CPU in the second embodiment, the addition-subtraction controller 8 in the present embodiment comprises a timing signal register 8a, a control signal register 8b, and a timing cumulative addition circuit 24 having a timing signal addition circuit 8c and a timing designation flip-flop 8d.

The timing signal register 8a holds a timing signal which can be subjected to an addition by the timing signal addition circuit 8c. The control signal register 8b holds an addition control signal which controls the timing signal addition circuit 8c, as well as the above-mentioned mode control signal. The timing signal addition circuit 8c operates under the control of the addition control signal of the control signal register 8b, and every time a clock pulse for timing signals is inputted, the timing designation flip-flop 8d holds an accumulated value obtained by the addition in the timing signal addition circuit 8c (cumulatively added value), and outputs a carry signal as the above-mentioned calculation indicative signal intermittently. In short, the interval of the carry signals becomes the calculation interval $T_1$.

This circuit operates in the same manner as the circuit of the second embodiment, under the control of the mode control signal and the addition control signal held in the control signal register 8b of the addition-subtraction controller 8. In short, the control signal consisting of the mode control signal and the addition control signal so controls that the accumulated value obtained by the addition-subtraction circuit 7 is inputted as a frequency value to the frequency setting register 1.

In the pulse signal generation circuit, every time a clock pulse for timing signals is inputted, the timing designation flip-flop 8d makes the timing signal addition circuit 8c sequentially accumulate the timing signal and holds the accumulated value. The pulse signal generation circuit is controlled by the control signal from the control signal register 8b so that the accumulation value, which is obtained by the accumulation with the addition-subtraction circuit 7 at the calculation interval $T_1$ that is the interval of the carry signal outputted intermittently from the timing designation flip-flop 8d, is set in the frequency setting register 1. As a result, there is no need of providing a CPU for controlling so that the accumulated value is set in the frequency setting register 1. This makes it possible to simplify the structure of the pulse generation circuit as compared with the second embodiment.

Figure 7:
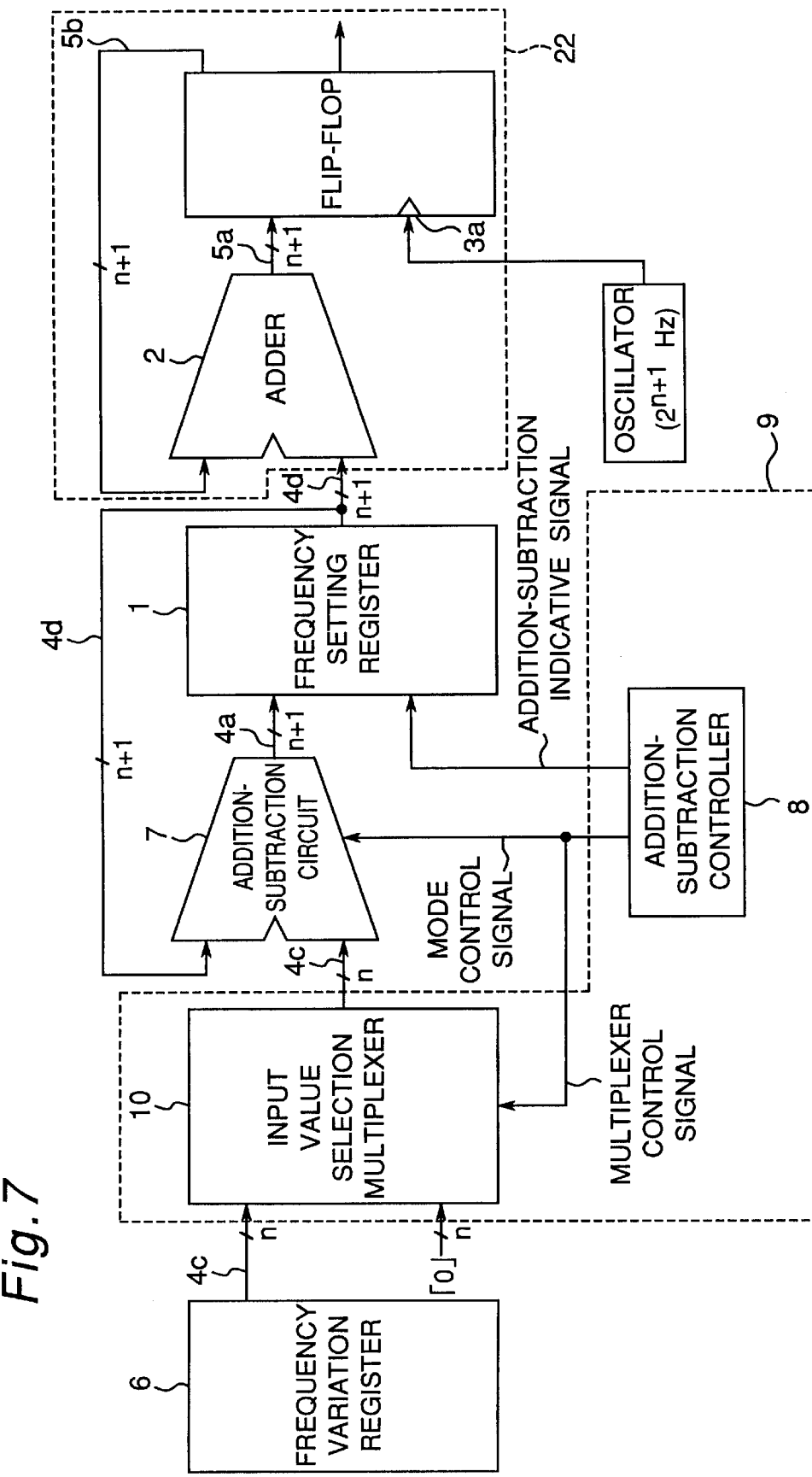
FIG. 7 is a block diagram showing the constitution of a pulse generation circuit according to a fourth embodiment of the present invention.
Figure 8:
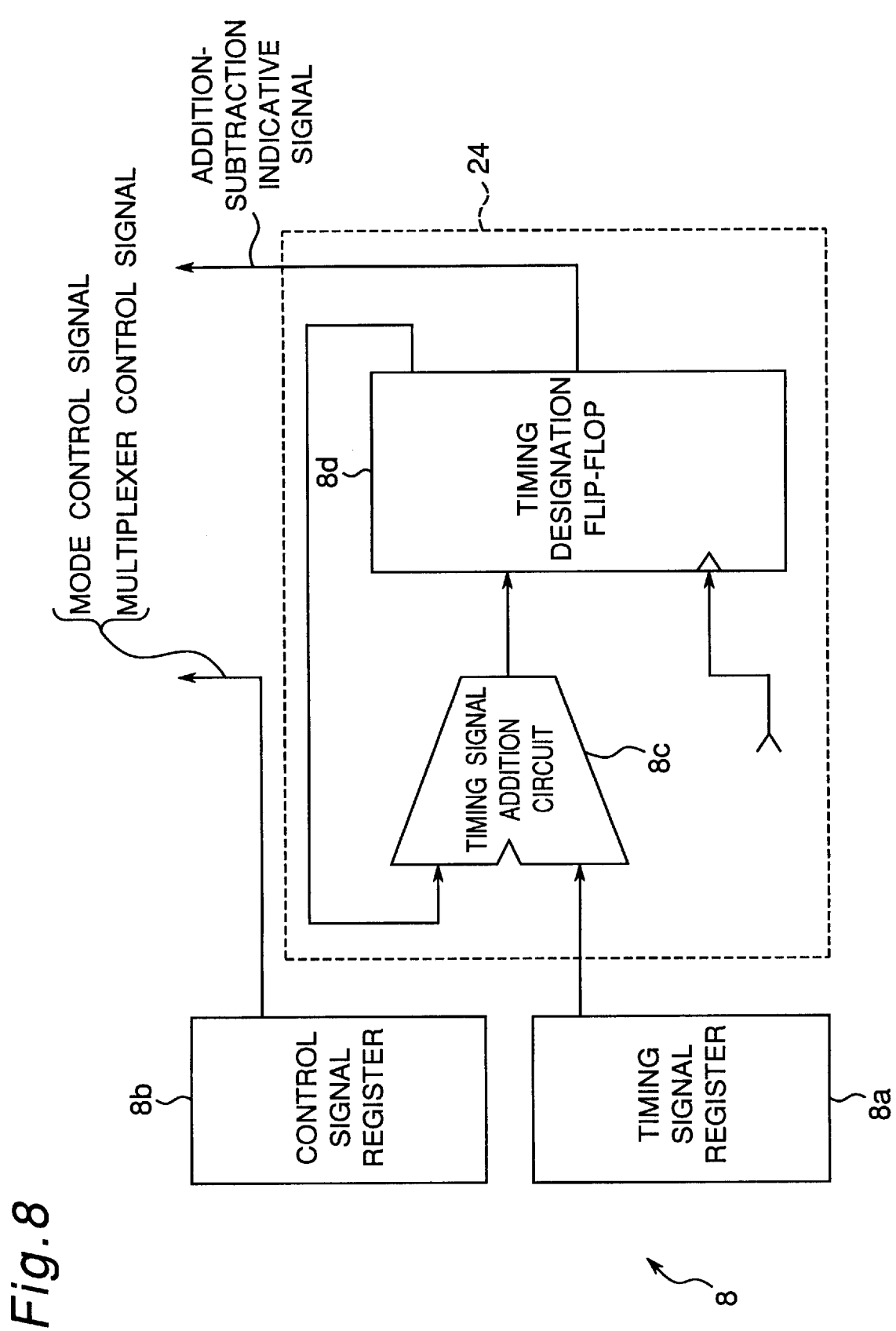
FIG. 8 is a block diagram showing the constitution of an addition-subtraction control circuit in the fourth embodiment of the present invention.

The fourth embodiment of the present invention will be described as follows, based on FIGS. 7 and 8. The elements substantially having the same functions as those of the third embodiment are referred to with the same reference numbers, and the description will be focused on the features different from the third embodiment. In the third embodiment, the addition and subtraction of the frequency variation value in the addition-subtraction circuit 7 is controlled by supplying the addition-subtraction indicative signal or suspending the supply. In contrast, in the present embodiment, the addition subtraction control means 9 comprises an input value selection multiplexer 10 which can select between "0" and the frequency variation value, as a value to be inputted into the addition-subtraction circuit 7. The input value selection multiplexer 10 controls the addition and subtraction of the frequency variation value in the addition-subtraction circuit 7.

To be more specific, the input value selection multiplexer 10 is disposed between the frequency variation register 6 and the addition-subtraction circuit 7, and controlled by an input value selection multiplexer control signal which is held in the control signal register 8b of the addition-subtraction controller 8 so as to compose the control signal together with the mode control signal. As a result, the input value selection multiplexer 10 selects between "0" and the frequency variation value as a value to be inputted into the addition-subtraction circuit 7.

In such a pulse signal generation circuit, in addition to the effects of the second embodiment, when the input value selection multiplexer 10 selects a value "0", there is no change in the accumulated value obtained by the addition-subtraction circuit 7, so that the frequency value becomes unchanged in the frequency setting register 1, and the frequency of the pulse signal to be outputted becomes fixed. As a result, similar to the third embodiment, the frequency value which is changed so far can be fixed halfway. Consequently, when this pulse signal is inputted into a stepping motor, the rotation speed of the stepping motor can be changed or maintained.

Similar to the third embodiment, there is no need of providing a CPU for controlling so that the accumulated value is set in the frequency setting register 1 like in the second embodiment. As a result, the structure of the pulse generation circuit can be more simplified than that of the second embodiment.

Figure 9:
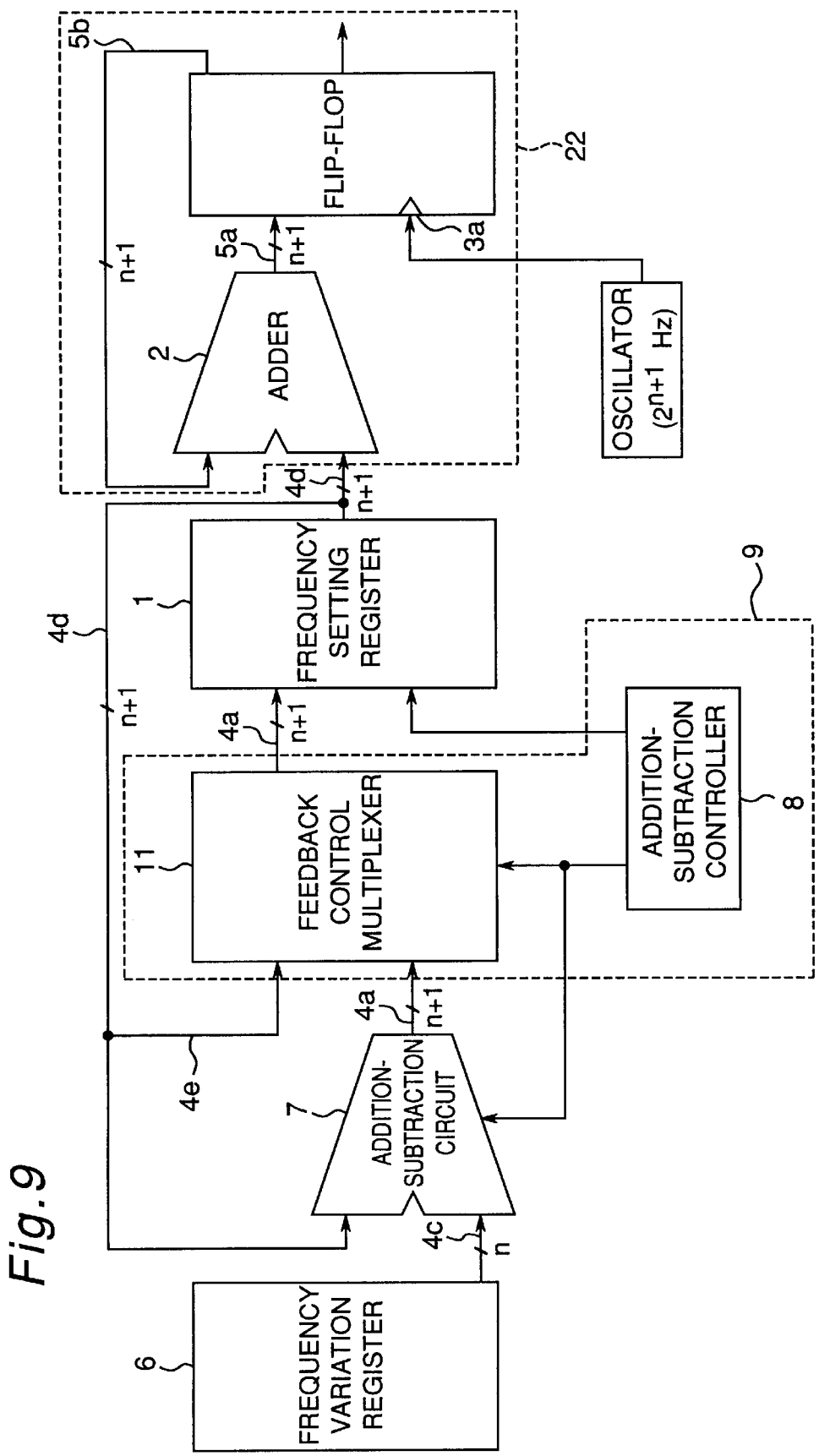
FIG. 9 is a block diagram showing the constitution of a pulse generation circuit according to a fifth embodiment of the present invention.

The fifth embodiment of the present invention will be described as follows, based on FIG. 9. The elements substantially having the same functions as those of the third embodiment are referred to with the same reference numbers, and the following description will be focused on the features different from the third embodiment. In the third embodiment, the addition and subtraction of frequency variation value in the addition-subtraction circuit 7 is controlled by supplying the addition-subtraction indicative signal or suspending the supply of it. In contrast, in the present embodiment, the addition-subtraction control means 9 comprises a feedback control multiplexer 11 which can select between a feedbacked accumulated value and a re-accumulated value obtained by adding the frequency variation value to the feedbacked accumulated value again in the addition-subtraction circuit 7. The operation of the feedback control multiplexer 11 controls the addition and subtraction of the frequency variation value in the addition-subtraction circuit 7.

To be more specific, the feedback control multiplexer 11 is disposed between the frequency setting register 1 and the addition-subtraction circuit 7, and connected to the frequency setting register 1 via a (n+1) bit bus 4e so that the accumulated value of the frequency variation value obtained by the addition-subtraction circuit 7 can be inputted directly from the frequency setting register 1. The feedback control multiplexer 11 is controlled by a frequency setting multiplexer control signal which is inputted into the control signal register 8b of the addition-subtraction controller 8 so as to compose the control signal together with the mode control signal. As a result, the multiplexer 11 selects between the accumulated value which is directly inputted from the frequency setting register 1 and the re-accumulated value which is subjected to addition or subtraction again in the addition-subtraction circuit 7, and inputs the selected value into the frequency setting register 1.

In such a pulse signal generation circuit, in addition to the effects of the second embodiment, when the accumulated value feedbacked from the frequency setting register 1 is selected by the feedback control multiplexer 11 and inputted into the frequency setting register 1, the frequency variation value is no longer accumulated by the addition-subtraction circuit 7. As a result, the frequency value in the frequency setting register 1 becomes unchanged and the frequency of the pulse signal to be outputted is fixed, so that the frequency value which is changed so far can be fixed halfway. Consequently, when this pulse signal is inputted into a stepping motor, the rotation speed of the stepping motor can be changed or maintained.

Similar to the third embodiment, there is no need of providing a CPU for controlling so that an accumulated value can be inputted into the frequency setting register 1 like in the second embodiment, so that the structure can be more simplified than in the second embodiment.

Figure 10:
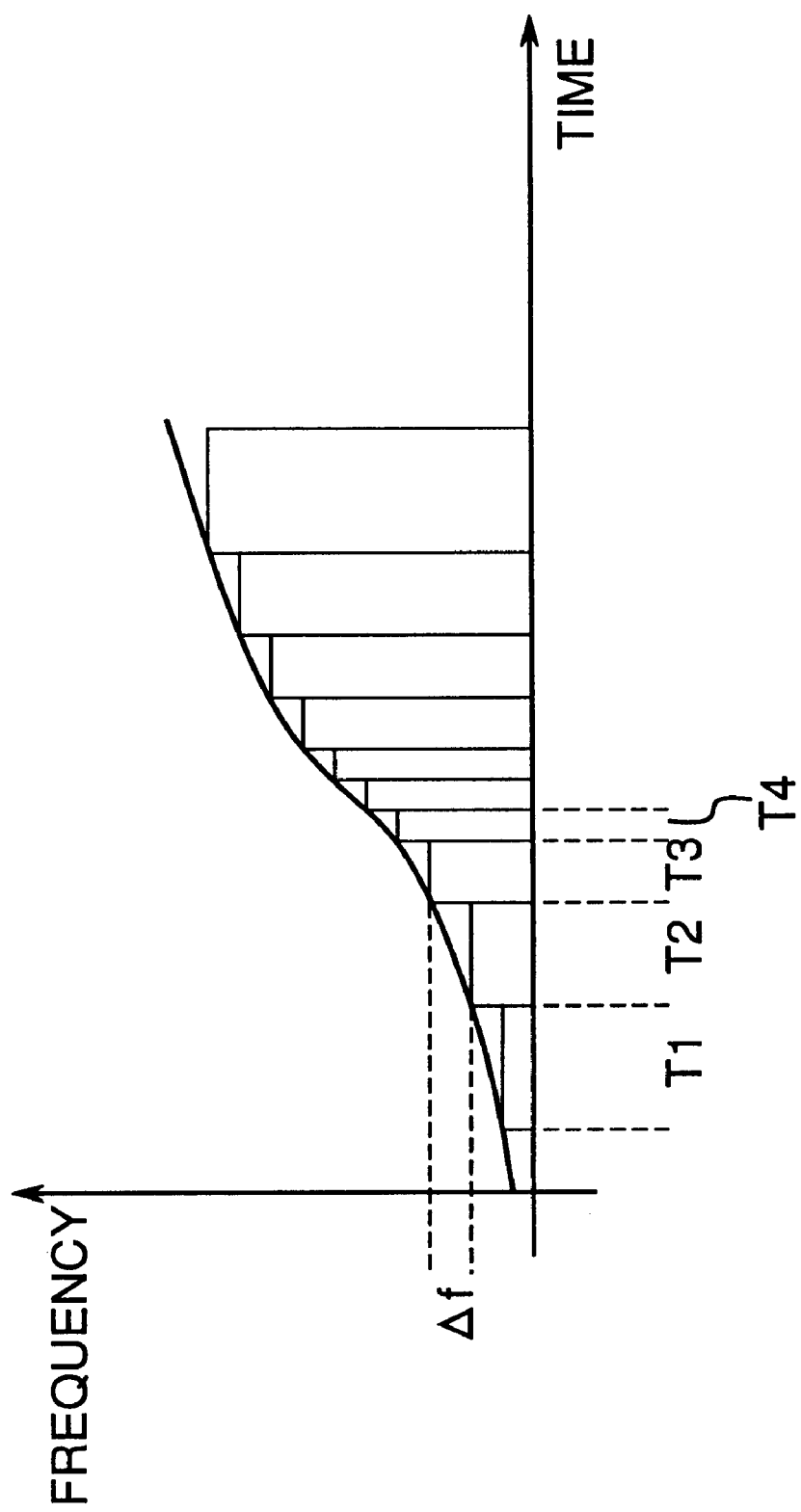
FIG. 10 shows changes in the frequency of a pulse signal generated in the sixth embodiment.

The sixth embodiment of the present invention will be described as follows, based on FIG. 10. The elements substantially having the same functions as those of the third embodiment are referred to with the same reference numbers, and the following description will be focused on the features different from the third embodiment. In the third embodiment, the interval of the addition-subtraction indicative signal from the addition-subtraction controller 8, that is, the calculation interval $T_1$ of the addition and subtraction in the addition-subtraction circuit 7 is fixed. In contrast, in the present embodiment, the calculation interval $T_1$ of the addition and subtraction in the addition-subtraction circuit 7 is variable.

Figure 6:
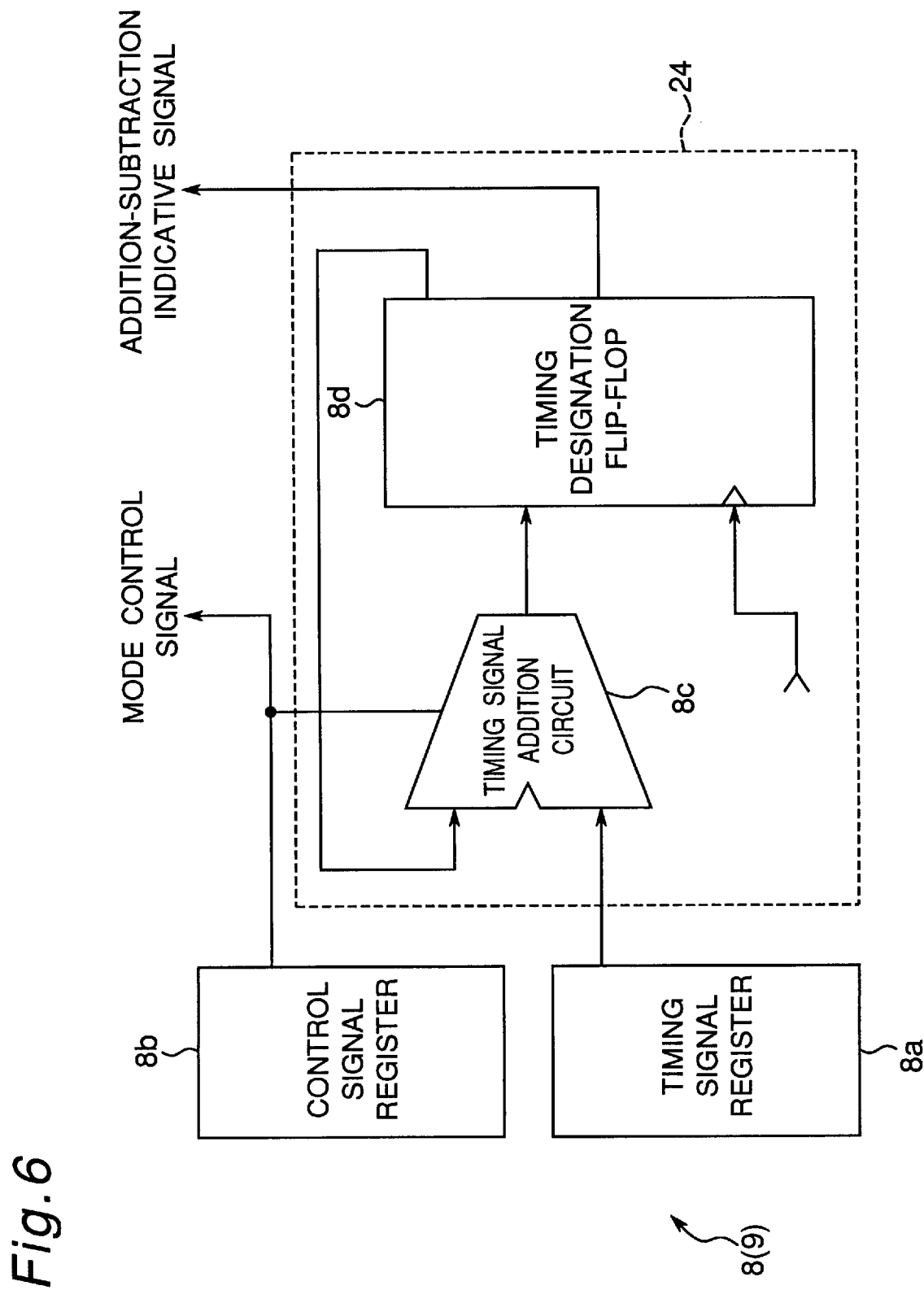
FIG. 6 is a block diagram showing the constitution of an addition-subtraction control circuit in a third embodiment of the present invention.

To be more specific, the timing signal in the timing signal register 8a is added so that a carry signal is outputted intermittently at various intervals from the timing designation flip-flop 8d by making an addition control signal in the control signal register 8b control the timing signal addition circuit 8c (see FIG. 6). Since the interval of the carry signal from the timing designation flip-flop 8d is the calculation interval $T_1$ of addition and subtraction in the addition-subtraction circuit 7, the calculation interval $T_1$ becomes variable, so as to have the values: $T_{11}, T_{12}, T_{13}, T_{14}$, and the like.

In order to make the timing designation flip-flop 8d output the carry at various intervals, in the addition-subtraction controller whose constitution is shown in FIG. 6, a value set in the timing signal register 8a may be changed appropriately by a CPU and the like.

Figure 13:
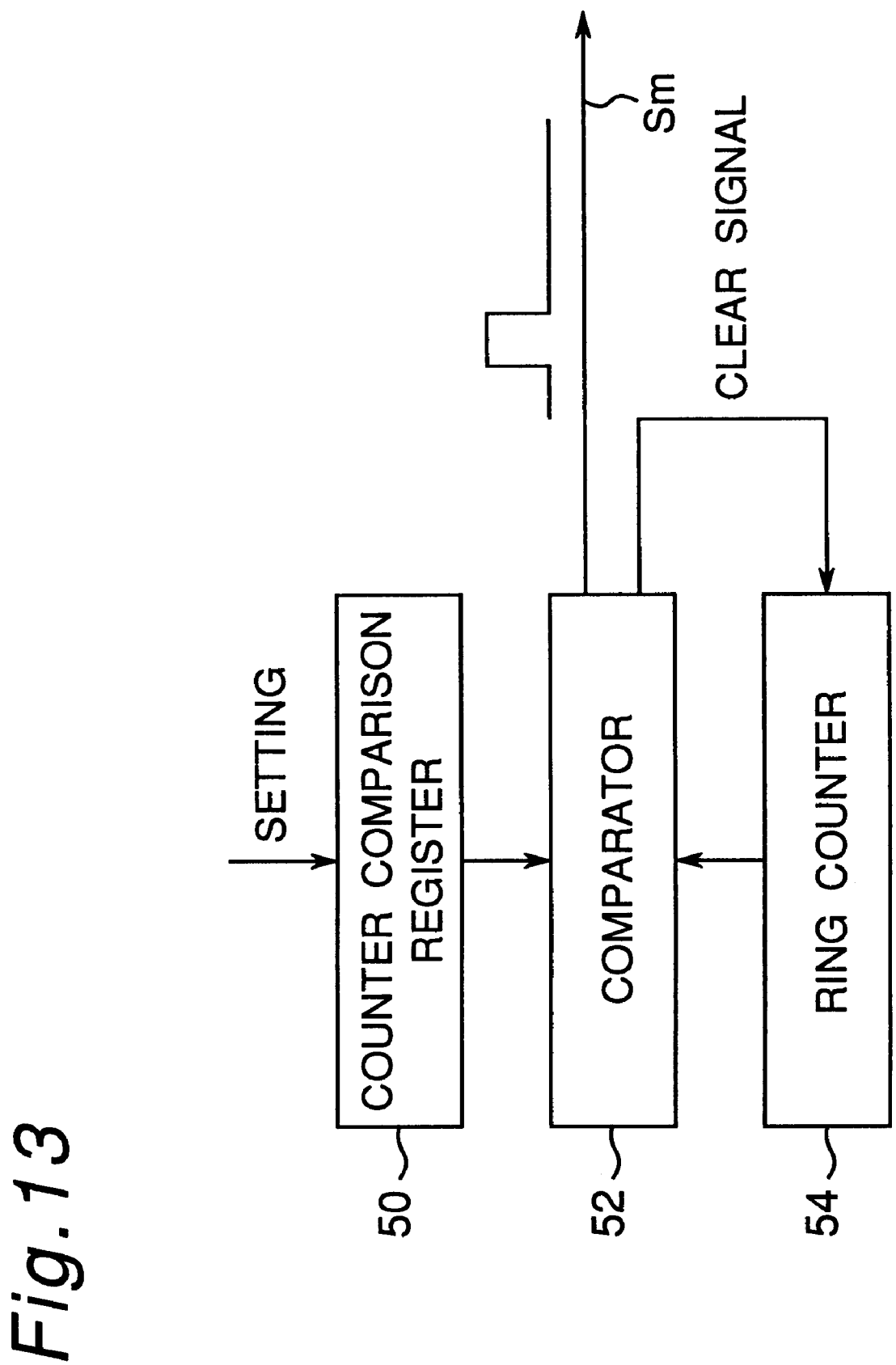
FIG. 13 is a block diagram showing a circuit in a CPU for generating an addition-subtraction indicative signal in the sixth embodiment.
Figure 14:
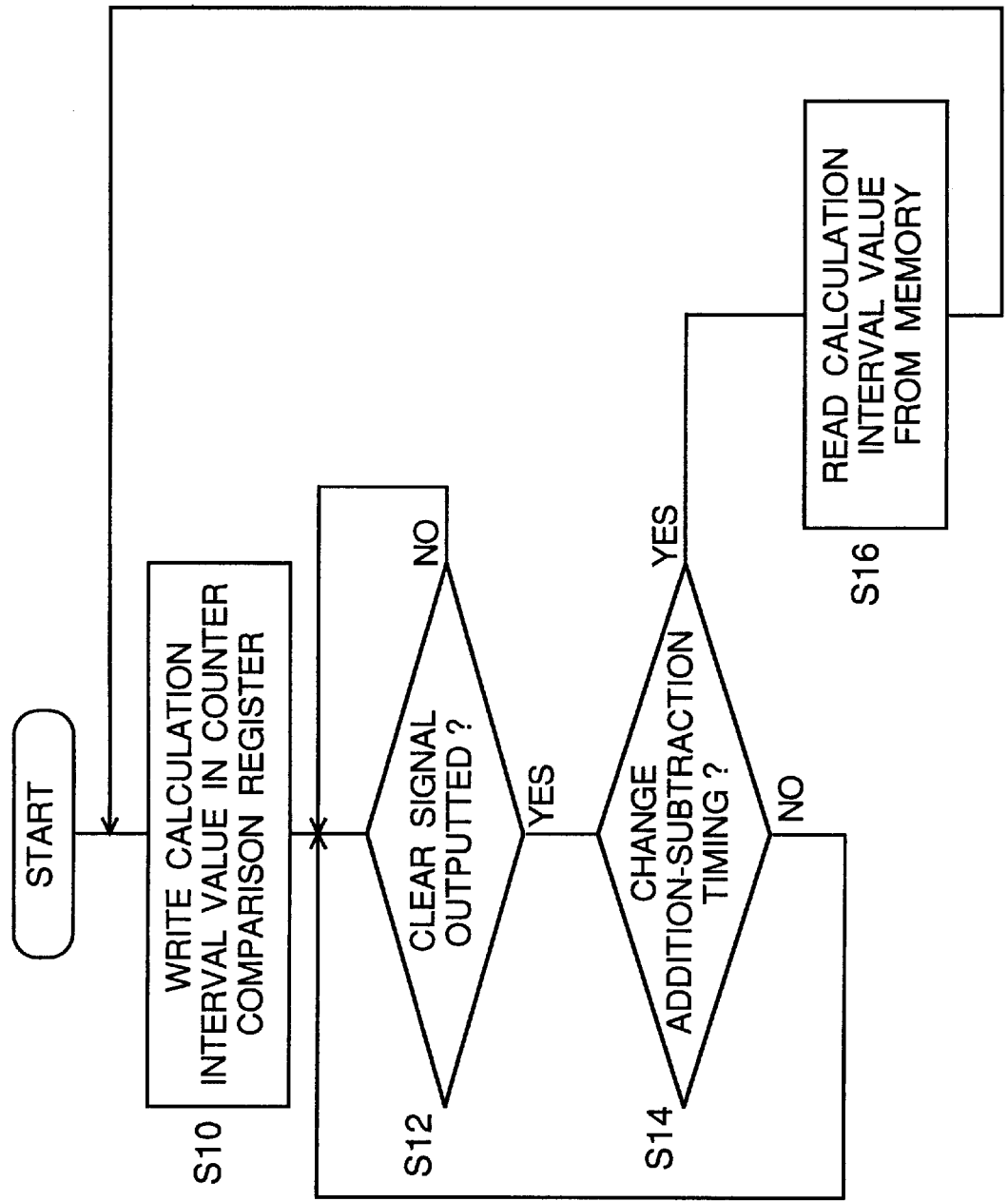
FIG. 14 is a flowchart illustrating the operation of the CPU for generating the addition-subtraction indicative signal in the sixth embodiment.

Instead, in the constitution as shown in FIGS. 13 and 14, the output interval of the addition-subtraction indicative signal may be changed appropriately. In the example shown in FIGS. 13 and 14, the addition-subtraction indicative signal is supplied by a CPU which comprises a counter comparison register 50, a comparator 52 and a ring counter 54, and a plurality of values designating the calculation interval, which is the output interval of the addition-subtraction indicative signal, are stored in a memory (not shown) in advance. The counter comparison register 50 is used for setting a value designating the calculation interval and inputs the value set in it into the comparator 52. The ring counter 54 counts pulses of a predetermined clock signal and inputs the count value into the comparator 52. The comparator 52 compares the count value of the ring counter 54 with the value set in the counter comparison register 50, and when both values coincide with each other the comparator 52 outputs a coincidence pulse signal Sm as the addition-subtraction indicative signal and inputs a clear signal into the ring counter 54 to initialize its count value to zero.

The operation of the CPU for outputting the addition-subtraction indicative signal will be described in detail. First, the CPU reads a value designating the calculation interval from the above memory and write it in the counter comparison register 50 (step S10). Next, the CPU waits until the count value of the ring counter 54 coincides with the value written in the counter comparison register 50 and the clear signal is outputted from the comparator 52 (step S12). After that if an addition-subtraction timing (the calculation interval) is not to be changed, the CPU will return to step S12 and wait again until the clear signal is outputted. If the addition-subtraction timing is to be changed, the CPU will read another value designating the calculation interval from the memory (step S16), and return to step S10 to write the value in the counter comparison register 50. The iteration of the above operation enables the calculation interval to change appropriately.

In such a pulse signal generation circuit, in addition to the effects of the third embodiment, the pulse width of a pulse signal to be outputted can be varied by making the addition-subtraction control means 9 change the calculation interval $T_1$. Consequently, when the pulse signal whose frequency changes is inputted into a stepping motor so as to change the rotation speed of the stepping motor, as shown in the curve of FIG. 10, the degree of changes in the frequency value, that is (a change $\Delta f$ in a frequency value)/(the calculation interval $T_1$), changes. As a result, it is possible to change the rotation speed of the stepping motor both rapidly and gradually.

Similar to the third embodiment, the addition-subtraction controller 8 is not composed of a CPU, so that the structure is simplified.

Figure 11:
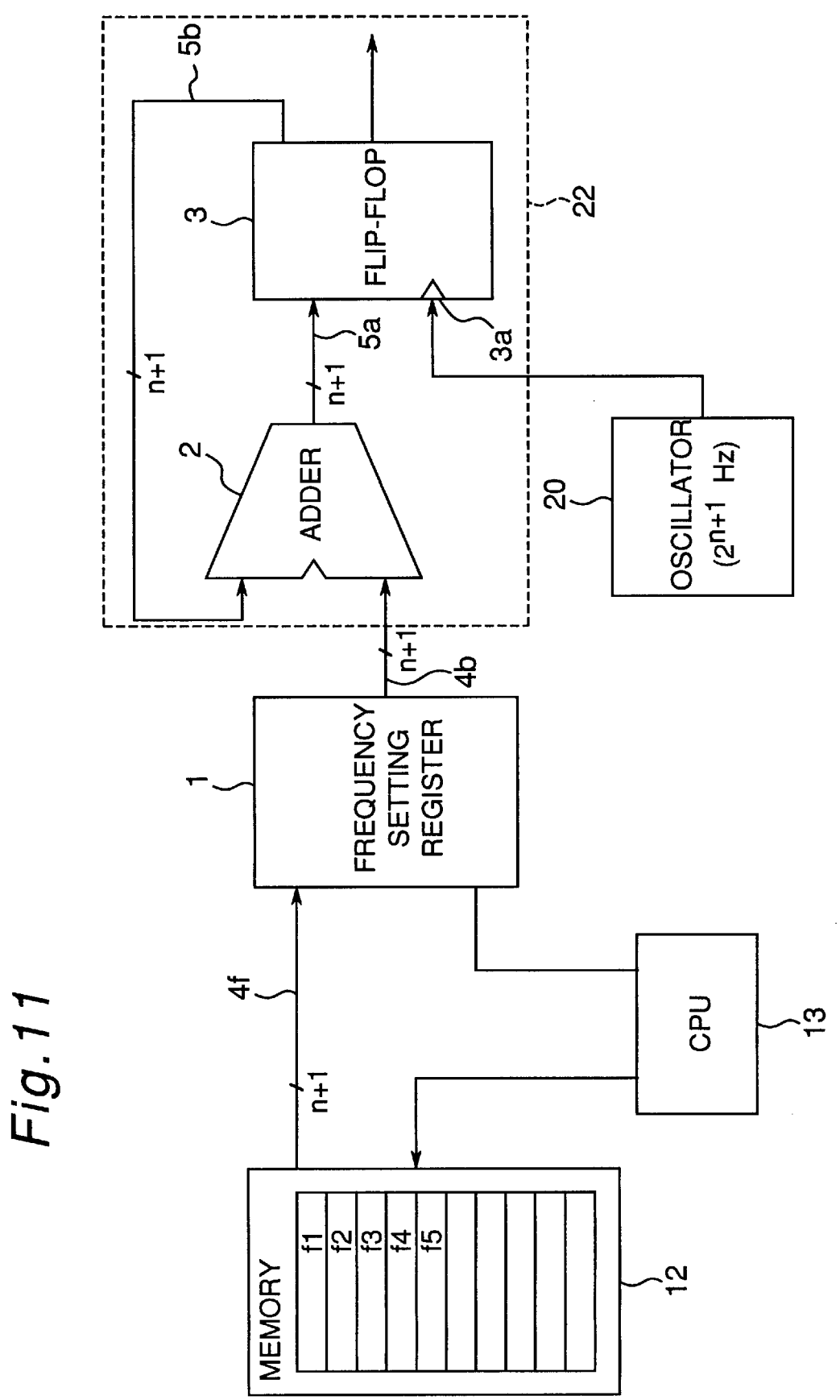
FIG. 11 is a block diagram showing the constitution of a pulse generation circuit according to a seventh embodiment of the present invention.

The seventh embodiment of the present invention will be described as follows, based on FIG. 11. The elements substantially having the same functions as those of the first embodiment are referred to with the same reference numbers, and the following description will be focused on the features different from the first embodiment. In the first embodiment, the frequency value to be set in the frequency setting register 1 is fixed, but in the present embodiment, the frequency value to be set in the frequency setting register 1 is variable.

To be more specific, this pulse signal generation circuit comprises a memory 12 and a CPU (frequency value selection control means) 13 in addition to the above-mentioned elements of the first embodiment.

The memory 12 stores a plurality of frequency values and is connected to the frequency setting register 1 via an (n+1)-bit bus 4f. The CPU 13 controls so as to select a frequency value among the frequency values in the memory 12 at a fixed selection interval $T_2$ and to set it in the frequency setting register 1. This selection interval $T_2$ corresponds to a pulse width or a pulse interval of the pulse signal.

In such a pulse signal generation circuit, in addition to the effects of the first embodiment, the frequency of a pulse signal to be generated can be made variable by making the CPU 13 input a value selected from the plurality of frequency values $f_1, f_2, f_3, f_4, f_5$ and the like in the memory 12 into the frequency setting register 1. Consequently, when this pulse signal is inputted into a stepping motor, the rotation speed of the stepping motor can be changed. Furthermore, as shown by the curve in FIG. 12 the degree of changes in the frequency value, that is (a change $\Delta f$ in a frequency value)/(the selection interval $T_2$), can be changed depending on the frequency values stored in the memory 12. Accordingly, it is possible to change the rotation speed of the stepping motor both rapidly and gradually.

Figure 4:
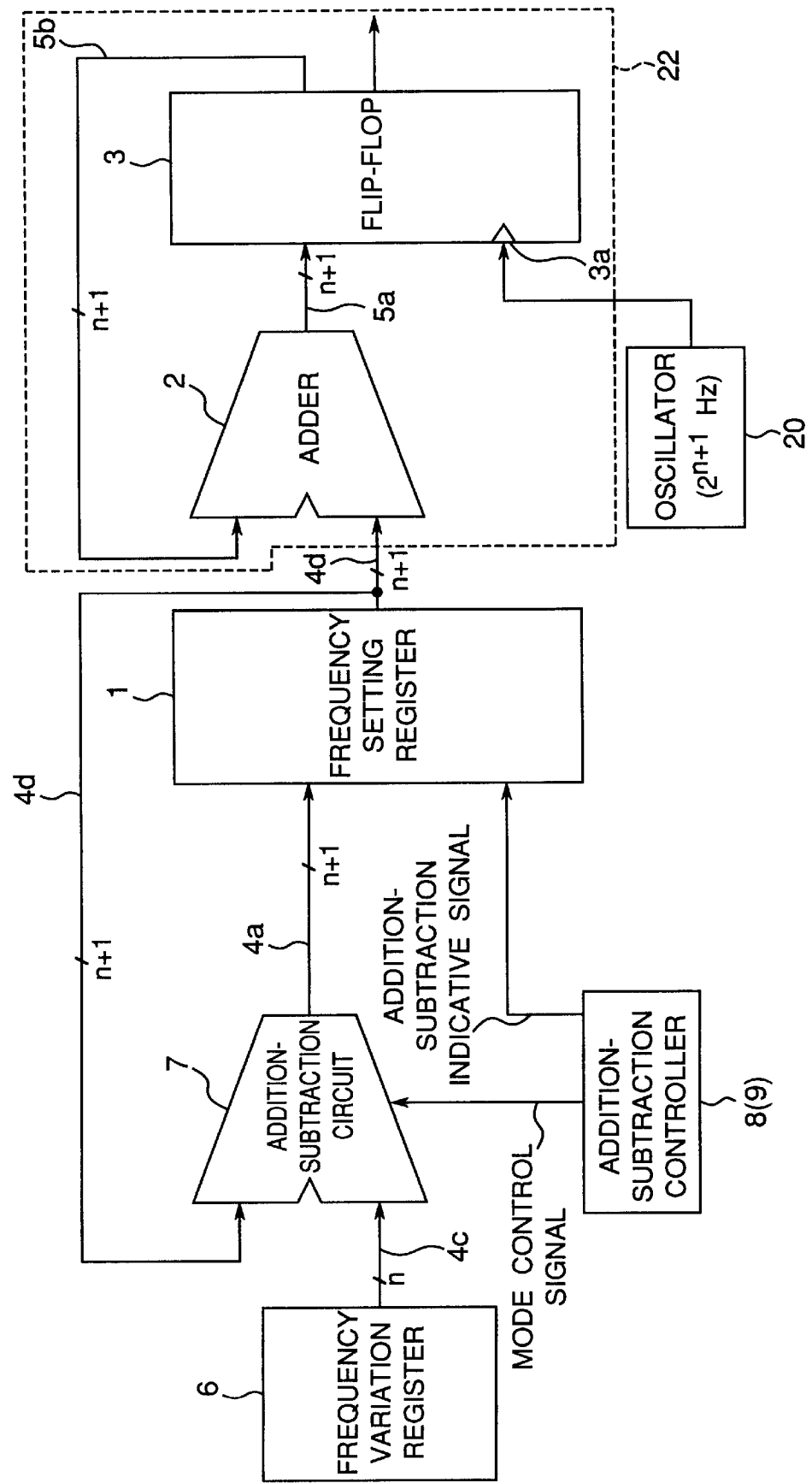
FIG. 4 is a block diagram showing the constitution of a pulse generation circuit according to a second embodiment of the present invention.
Figure 5:
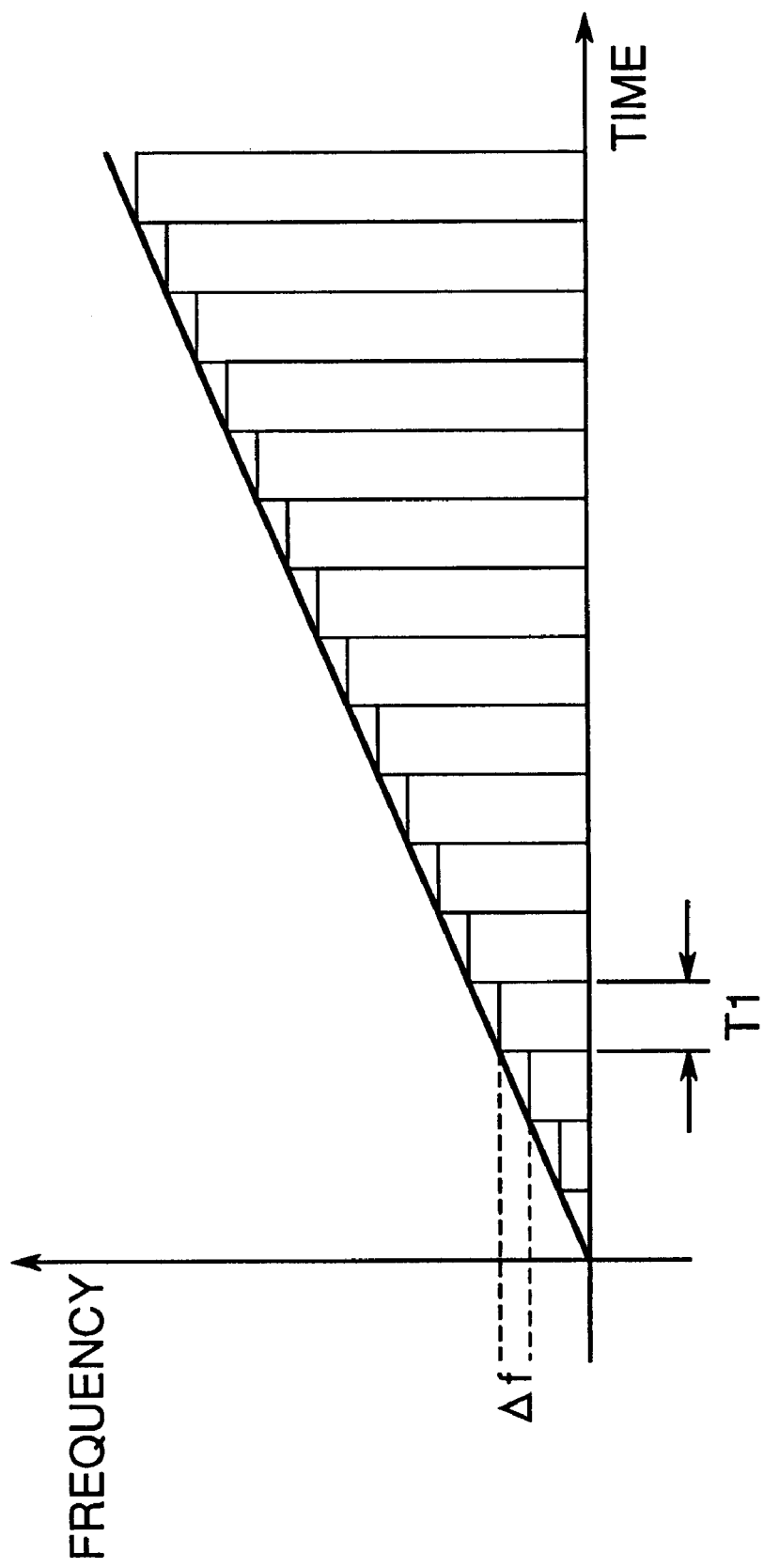
FIG. 5 shows changes in the frequency of a pulse signal generated in the second embodiment.
Figure 12:
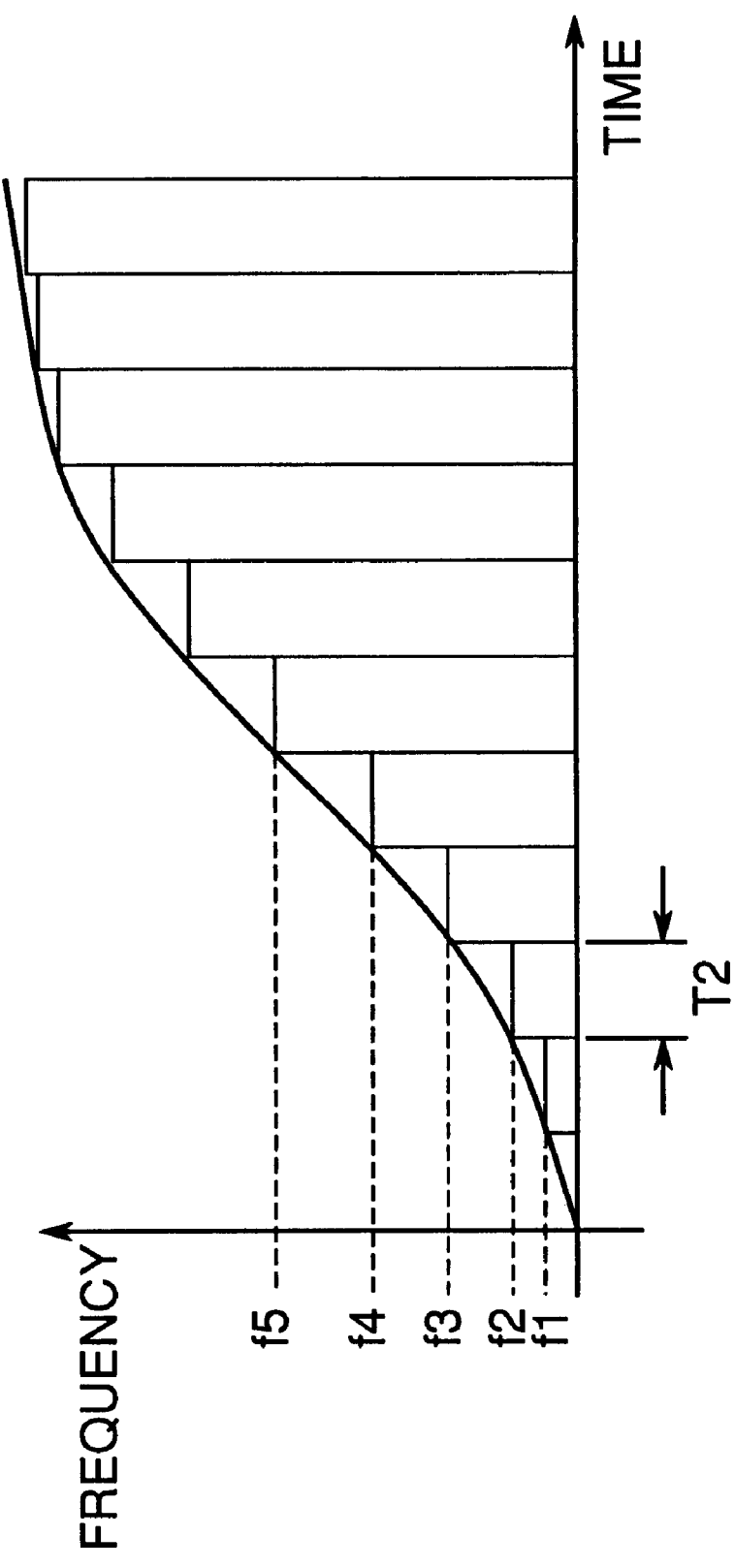
FIG. 12 shows changes in the frequency of a pulse signal generated in the seventh embodiment.

In the pulse signal generation circuit whose constitution is shown in FIG. 4, the frequency of a pulse signal to be generated can be also changed as shown in FIG. 12 by appropriately changing a value set in the register 6.

The eighth embodiment of the present invention will be described as follows. The elements substantially having the same functions as those of the seventh embodiment are referred to with the same reference numbers, and the following description will be focused on the features different from the seventh embodiment. In the seventh embodiment, the selection interval $T_2$ is fixed, while in the present embodiment the selection interval $T_2$ is variable.

In order to make the selection interval variable, for example, in the constitution shown in FIGS. 13 and 14, the calculation interval values stored in the memory (not shown) may be regarded as the selection interval values and the coincidence signal Sm outputted from the comparator 52 may be used as a control signal for selecting a frequency value from the values in the memory 12 to set it in the frequency setting register 1.

Figure 15:
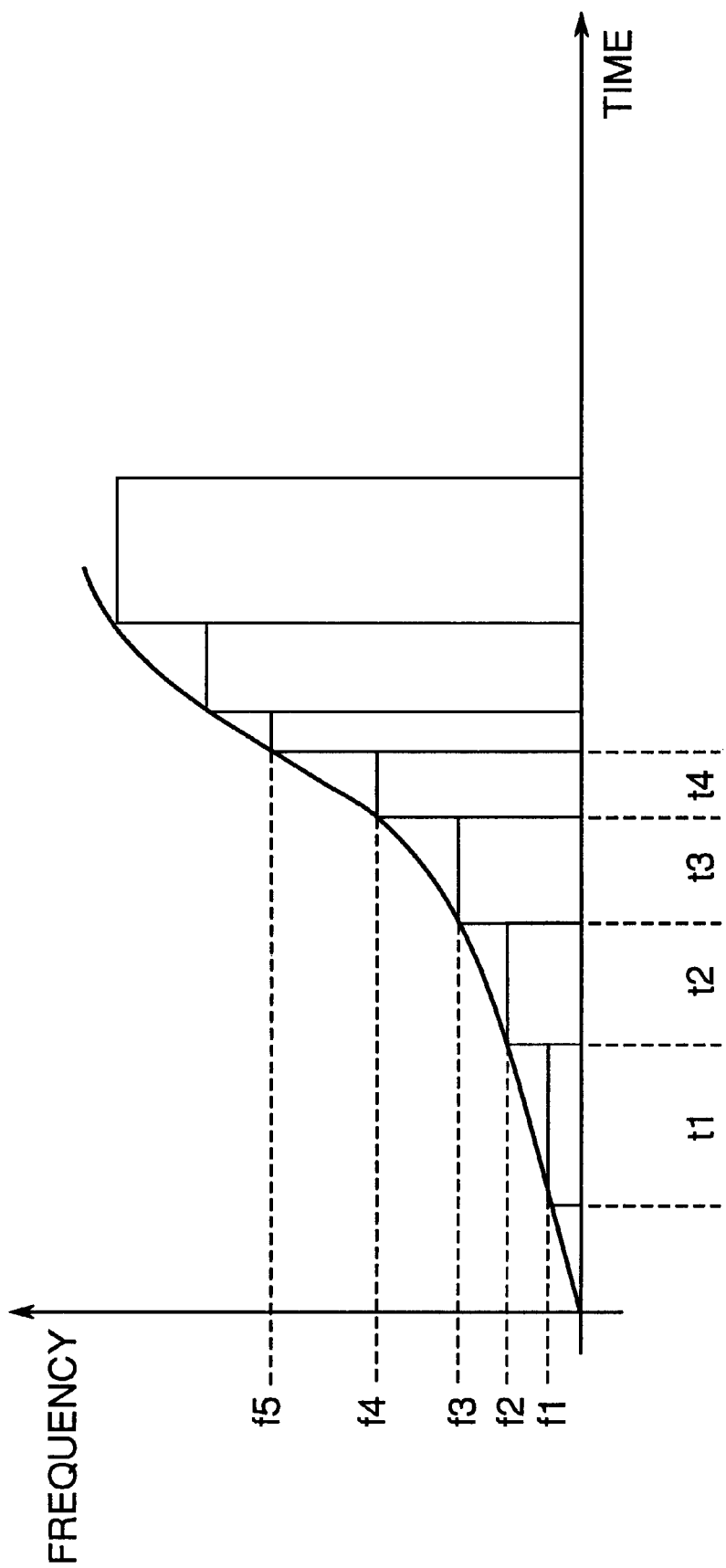
FIG. 15 shows changes in the frequency of a pulse signal generated in a eighth embodiment.
Figure 16:
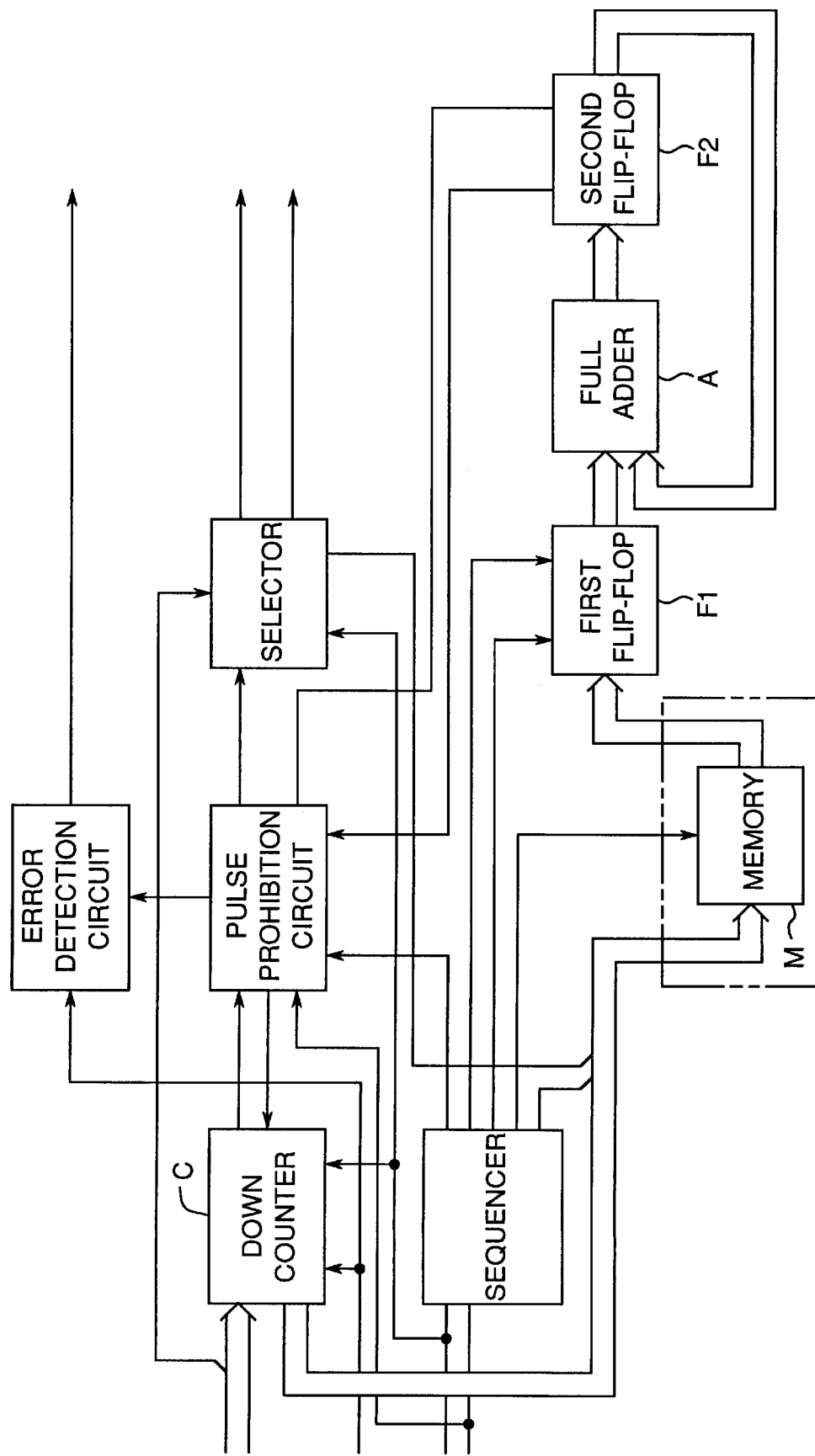
FIG. 16 is a block diagram illustrating a pulse signal generation circuit according to a prior art.

In such a pulse signal generation circuit, by making the CPU 13 change the selection interval $T_2$, the frequency of a pulse signal to be generated can be changed as shown in FIG. 15. In other words, it is possible to change appropriately not only a change $\Delta f$ of the frequency value but also the selection interval $T_2$. According to this, the degree of changes in the frequency value can be changed more easily than in the seventh embodiment. Consequently, when this pulse signal is inputted into a stepping motor, the rotation speed of the stepping motor can be controlled more easily.

In the first to eighth embodiments, the frequency setting register 1 which is (n+1) bits long is used for setting a frequency value of $2^n$ or smaller; however, a register which is more than (n+1) bits long may be used instead.

In the first to eighth embodiments, the adder 2 performs addition of a frequency value every time a clock pulse rises;

however, the addition of a frequency value may be performed every time a clock pulse falls.

In the second to sixth embodiments, the addition and subtraction of a frequency variation value by the addition-subtraction circuit 7 is controlled so as to change the frequency values or to make them fixed. However, for example, after the frequency value is changed and if there is no need of fixing it, the structure can be more simplified.

In the third to six embodiments, the addition-subtraction control means 9 comprises the timing signal register 8b, the timing signal addition circuit 8c, the timing designation flip-flop 8d, and the control signal register 8a; however, it may be composed of a CPU.

In the sixth embodiment, the addition and subtraction of a frequency variation value by the addition-subtraction circuit 7 are controlled by making it possible to supply the addition-subtraction indicative signal and to suspend the supply. However, the same effects can be obtained by controlling the addition and subtraction of the frequency variation value in the addition-subtraction circuit 7 by providing either the input value selection multiplexer 10 or the feedback control multiplexer 11.

In the first to eighth embodiments, with respect to a frequency value of $2^n$ to be set in the frequency setting register 1, the power n can be smaller than 1.

What is claimed is:

1. A pulse signal generation circuit comprising:
   a frequency setting register which is at least (n+1) bits long for setting a value of $2^n$ or smaller as a frequency value of a pulse signal to be generated; and
   cumulative addition means, having an adder and a flip-flop which is at least (n+1) bits long, for repeating at a rate of $2^{n+1}$ times per second, operations of making said adder add a value set in said frequency setting register to a value held in said flip-flop and then making said flip-flop hold the addition result, and for outputting a signal having a value of (n+1)th bit in said flip-flop as said pulse signal.

2. The pulse signal generation circuit of claim 1, comprising:
   a frequency variation register for setting a frequency variation value;
   an adder-subtracter;
   addition-subtraction control means for controlling said frequency variation register and said adder-subtracter so as to repeat, at a predetermined calculation interval, operations of adding or subtracting a value set in said frequency setting register and a value set in said frequency variation register with said adder-subtracter and then re-setting a result of the addition or subtraction in said frequency setting register as said frequency value.

3. The pulse signal generation circuit of claim 2, wherein said addition-subtraction control means comprises means for controlling the suspension and activation of said operations repeated at said calculation interval.

4. The pulse signal generation circuit of claim 2, wherein said addition-subtraction control means comprises a multiplexer disposed between said frequency variation register and said adder-subtracter for selecting between a value "0" and a value set in said frequency variation register, a value selected by said multiplexer being inputted into said adder-subtracter.

5. The pulse signal generation circuit of claim 2, wherein said addition-subtraction control means comprises a multiplexer disposed between said adder-subtracter and said frequency setting register for selecting between a result of the addition or subtraction of said adder-subtracter and a value set in said frequency setting register, said addition-subtraction control means re-setting a value selected by said multiplexer in said frequency setting register.

6. The pulse signal generation circuit of claim 2, wherein said addition-subtraction control means is capable of changing said calculation interval.

7. The pulse signal generation circuit of claim 2, wherein said addition-subtraction control means comprises:
   a calculation interval register for setting said calculation interval;
   counting means for counting pulses of a predetermined clock signal; and
   comparison means for comparing a count value of said counting means with a value set in said calculation interval register and outputting a coincidence signal when both values coincide with each other;
   said addition-subtraction control means re-setting a result of the addition or subtraction of said adder-subtracter in said frequency setting register and initializing the count value of said counting means to zero, when said coincidence signal is outputted.

8. The pulse signal generation circuit of claim 2, wherein said addition-subtraction control means comprises:
   a control register for holding a value designating a type of calculation which said adder-subtracter performs and outputting a signal of said value as a control signal for said adder-subtracter;
   a timing register for setting a value which designates said calculation interval; and
   timing cumulative addition means including a timing adder and a timing designation flip-flop; and
   said timing cumulative addition means repeats at a predetermined period, operations of making said timing adder add a value set in said timing register to a value held in said timing designation flip-flop and then making said timing designation flip-flop input and hold the addition result, and outputs a carry signal to a predetermined bit in said timing designation flip-flop as a control signal for re-setting the result of addition or subtraction of said adder-subtracter in said frequency setting register at said calculation interval.

9. The pulse signal generation circuit of claim 1 comprising:
   frequency storage means for storing a plurality of frequency values;
   frequency value selection control means for selecting a frequency value from said plural values stored in said frequency storage means and setting the selected value in said frequency setting register at a predetermined period as a selection interval.

10. The pulse signal generation circuit of claim 9, wherein said frequency selection control means is capable of changing said selection interval.

11. The pulse signal generation circuit of claim 10, wherein
   said frequency selection control means comprises:
   a selection interval register for setting said selection interval;
   counting means for counting pulses of a predetermined clock signal; and
   comparison means for comparing a count value of said counting means and a value set in said selection interval register and outputting a coincidence signal when both values coincide with each other;

said frequency selection control means selecting a frequency value from a plurality of values stored in said frequency storage means, re-setting the selected value in said frequency setting register, and initializing said count value of said counting means to zero, every time said coincidence signal is outputted.

12. The pulse signal generation circuit of claim 1, further comprising:
a clock pulse generator and application device that generates a clock signal at a frequency of $2^{n+1}$ cycles per second and applies said clock signal to said cumulative addition means to drive said repeating of said cumulative addition means at said rate of $2^{n+1}$ times per second.

13. The pulse signal generation circuit of claim 1, wherein said output of said signal having a value of (n+1)th bit in said flip-flop as said pulse signal is connected to a pulse motor, wherein said frequency value of said pulse signal controls linear acceleration and deceleration of the pulse motor.

14. The pulse signal generation circuit of claim 1, wherein said output of said signal having a value of (n+1)th bit in said flip-flop as said pulse signal maintains a 1:1 duty cycle for every said frequency value of said pulse signal.

15. A pulse signal generation method comprising the steps of:
setting a value of $2^n$ or smaller as a frequency value of a pulse signal to be generated in a frequency setting register;
cumulatively adding a value set in said frequency setting register at a rate of $2^{n+1}$ times per second; and
outputting, as said pulse signal, a signal having a value of (n+1)th bit in the cumulative addition value obtained by said cumulative addition.

16. The pulse signal generation method of claim 15 comprising the steps of:
setting a frequency variation value in a frequency variation register;
cumulatively adding or subtracting a value set in said frequency variation register at a predetermined calculation interval; and
re-setting at said calculation interval, a cumulative value of the addition or subtraction obtained by said addition or subtraction at said calculation interval in said frequency setting register as said frequency value.

17. The pulse signal generation method of claim 16 comprising the steps of:
suspending operations of said addition or subtraction performed at said calculation interval and of setting said cumulative value in said frequency setting register; and
starting the suspended operations.

18. The pulse signal generation method of claim 16, wherein
an operand of said addition or subtraction is switched between a value set in said frequency variation register and a value "0" at a predetermined timing.

19. The pulse signal generation method of claim 16, wherein
the value to be re-set in said frequency setting register at said calculation interval is switched between a result of said addition or subtraction and a value set in said frequency setting register at a predetermined timing.

20. The pulse signal generation circuit of claim 19, wherein said frequency selection control circuit comprises:
a selection interval register for setting the selection interval;
a counter for obtaining a count value by counting pulses of a predetermined clock signal; and
a comparator for comparing the count value with a value set in said selection interval register and for outputting a coincidence signal when the count value and the value set in said selection interval register are coincident;
said frequency selection control circuit selecting a selected frequency value from said plurality of value stored in said frequency storage memory, re-setting the selecting a selected frequency value into said frequency setting register, and initializing the count value of the counter to zero, every time the coincidence signal is output.

21. A pulse signal generation circuit comprising:
a frequency setting register at least (n+1) bits long that sets a value of $2^n$ or smaller as a frequency value of a pulse signal;
a cumulative addition circuit including an adder and a flip-flop, said cumulative addition circuit repeating, at a predetermined interval, operations of said adder obtaining an addition result by adding a value set in the frequency setting register to a value held in said flip-flop and said flip-flop storing the addition result, and said cumulative addition circuit then outputting a signal having a value of (n+1)th bit in said flip-flop as the pulse signal.

22. The pulse signal generation circuit of claim 21, further comprising:
a frequency variation register for setting a frequency variation value;
an adder-subtracter;
an addition-subtraction control circuit for repeating, at a predetermined calculation interval, operations of said adder-subtracter obtaining an addition/subtraction result by adding or subtracting a value set in said frequency setting register and a value set in said frequency variation register and re-setting the addition/subtraction result into said frequency setting register as the frequency value.

23. The pulse signal generation circuit of claim 22, wherein said addition-subtraction control circuit comprises an activation device for controlling the suspension and activation of the operations repeated at the calculation interval.

24. The pulse signal generation circuit of claim 22, wherein said addition-subtraction control circuit comprises a multiplexer between said frequency variation register and said adder-subtracter for selecting a selected value between a zero value and a value set in said frequency variation register, and for inputting the selected value into the adder-subtracter.

25. The pulse signal generation circuit of claim 22, wherein said addition-subtraction control circuit comprises a multiplexer between said adder-subtracter and said frequency setting register for selecting a selected value between the addition/subtraction result of the adder-subtracter and a value set in said frequency setting register, and for re-setting the selected value into said frequency setting register as the frequency value.

26. The pulse signal generation circuit of claim 22, wherein said addition-subtraction control circuit changes the calculation interval.

27. The pulse signal generation circuit of claim 22, wherein said addition-subtraction control circuit comprises:
a calculation interval register for setting the calculation interval;

a counter for obtaining a count value by counting pulses of a predetermined clock signal; and a comparator for comparing the count value with a value set in said calculation interval register and for outputting a coincidence signal when the count value and the value set in said calculation interval register are coincident;

said addition-subtraction control circuit re-setting the addition/subtraction result of the adder-subtracter into said frequency setting register and initializing the count value of the counter to zero, when said coincidence signal is output.

28. The pulse signal generation circuit of claim 22, wherein said addition-subtraction control circuit comprises:

a control register for holding a type value designating a type of calculation performed by said adder-subtracter and for outputting a type signal representative of said type value as a control signal for said adder-subtracter;

a timing register for setting a value that designates the calculation interval; and a timing cumulative addition circuit including a timing adder and a timing designation flip-flop, said timing cumulative addition circuit repeating, at a predetermined interval, operations of said adder obtaining a timing addition result by adding a value set in said timing register to a value held in said timing designation flip flop and said timing designation flip-flop inputting and holding said timing addition result, and outputting a carry signal to a predetermined bit in said timing designation flip-flop as a control signal for re-setting the addition/subtraction result into said frequency setting register at said calculation interval.

29. The pulse signal generation circuit of claim 21, further comprising:

a frequency storage memory for storing a plurality of frequency values; and a frequency value selection control circuit for selecting a selected frequency value from said plurality of values stored in said frequency storage memory, and for setting the selected frequency value into said frequency setting register at a predetermined period as a selection interval.

30. The pulse signal generation circuit of claim 29, wherein said frequency selection control circuit changes the selection interval.

31. The pulse signal generation circuit of claim 17, further comprising:

a clock pulse generator and application device that generates a clock signal at a frequency of $2^{n+1}$ cycles per second and applies said clock signal to said cumulative addition circuit to drive said repeating of said cumulative addition circuit at said rate of $2^{n+1}$ times per second.

32. The pulse signal generation circuit of claim 17, wherein said output of said signal having a value of (n+1)th bit in said flip-flop as said pulse signal is connected to a pulse motor, wherein said frequency value of said pulse signal controls linear acceleration and deceleration of the pulse motor.

33. The pulse signal generation circuit of claim 17, wherein said output of said signal having a value of (n+1)th bit in said flip-flop as said pulse signal maintains a 1:1 duty cycle for every said frequency value of said pulse signal.

* * * * *

UNITED STATES PATENT AND TRADEMARK OFFICE
CERTIFICATE OF CORRECTION

PATENT NO.   : 6,003,053
DATED        : December 14, 1999
INVENTOR(S)  : Y. Tanaka et al.

It is certified that error appears in the above-identified patent and that said Letters Patent is hereby corrected as shown below:

Column 13,
Line 64, (claim 20, line 1) of the printed patent, "claim 19" should be -- claim 21 --.

Column 14,
Line 9, (claim 20, line 13) of the printed patent, "value" should be -- values --.

Column 16,
Line 14, (claim 31, line 1) of the printed patent, "claim 17" should be -- claim 21 --.
Line 22, (claim 32, line 1) of the printed patent, "claim 17" should be -- claim 21 --.
Line 28, (claim 33, line 1) of the printed patent, " claim 17" should be -- claim 21 --.

Title page,
Item [56], References Cited, the following U.S. Patent Document was omitted and should be inserted:
5,255,213     10/1993      Wasserman      364/703

Title page,
Item [56], References Cited, the following Foreign Patent Documents were omitted and should be inserted:
2119979      11/1983      United Kingdom
0373768      6/1990       EPO
0202347      11/1986      EPO

UNITED STATES PATENT AND TRADEMARK OFFICE
CERTIFICATE OF CORRECTION

PATENT NO. : 6,003,053
DATED : December 14, 1999
INVENTOR(S) : Y. Tanaka et al.

It is certified that error appears in the above-identified patent and that said Letters Patent is hereby corrected as shown below:

Title page,
Item [56], References Cited, the following Other Documents were omited and should be inserted: Nieznanski: "The Accumulator in Integral-Cycle AC Power Control" IEEE Transactions On Industrial Electronics, Vol. 42, No. 3, pages 331-334, published June 1995.
     Patent Abstract of Japan, Vol 5. no. 198 (E-87), EPO, Publication No. 56122227.

Signed and Sealed this

Twenty-fifth Day of September, 2001

*Attest:*

NICHOLAS P. GODICI
*Attesting Officer*     Acting Director of the United States Patent and Trademark Office